United States Patent [19]
Montgomery et al.

[11] Patent Number: 5,420,719
[45] Date of Patent: May 30, 1995

[54] LASER BEAM FREQUENCY DOUBLING SYSTEM

[75] Inventors: John W. S. Montgomery, Stittsville; Pierre Langlois, Sainte-Foy, both of Canada

[73] Assignee: Lumonics Inc., Kanata, Canada

[21] Appl. No.: 120,908

[22] Filed: Sep. 15, 1993

[51] Int. Cl.$^6$ .......................... G02B 5/18; G02B 27/44; G02F 1/37
[52] U.S. Cl. ................................ 359/566; 359/328; 359/569; 359/572
[58] Field of Search ............... 359/326, 328, 332, 565, 359/566, 569, 572

[56] References Cited

U.S. PATENT DOCUMENTS

| | | | |
|---|---|---|---|
| 3,821,795 | 6/1974 | Okano | 359/569 |
| 4,360,586 | 11/1982 | Flanders et al. | 359/569 |
| 4,448,485 | 5/1984 | Bergman et al. | 359/569 |
| 4,618,214 | 10/1986 | Horwitz | 359/569 |
| 5,058,981 | 10/1991 | Umegaki et al. | 359/565 |
| 5,166,826 | 11/1992 | Ruprecht | 359/569 |

FOREIGN PATENT DOCUMENTS 3707984  3/1988  Germany.

OTHER PUBLICATIONS

Lumonics Inc., "Hyperyag Series Lasers" pamphlet, 1991.
Lumonics Inc., "Yagmaster Series III" pamphlet, 1992.
Zamula, G. T. et al., "Filtration of Optical Harmonics of a Laser by Using a Zone Plate", Soviet Physics Lebedev Institute Report, 1992.

Primary Examiner—Martin Lerner

[57] ABSTRACT

For separation of second and higher order second harmonics from a composite laser beam, a substrate is provided with a binary level relief structure that, in the preferred construction, consists of a regular series of parallel substantially rectangular grooves on one or both of its major surfaces. In a transmissive grating, which is traversed only once by the beam, the depth h of the grooves is chosen to be $\lambda$ divided by $n_1 - n_0$, where $n_0$ is the refractive index external to the grating (assumed to be approximately unity for air), $n_1$ is the refractive index of the substrate, and $\lambda$ is the wavelength that will pass directly through the grating, e.g. the second harmonic. Wavelengths greater than $\lambda$, e.g. the fundamental $2\lambda$, will be diffracted away from the beam path. When a reflective coating is applied on the surface with the relief structure, the groove depth is chosen to be $\lambda$ divided by $2n_0$ or $2n_1$ depending upon whether the beam encounters the relief structure from outside the substrate or from inside, respectively. A more general formula for the value of h provides for the incident beam arriving at an inclination to the normal to the substrate surface. Also the relief structure itself can be more general in nature, consisting of elevated and unelevated portions of various shapes.

19 Claims, 6 Drawing Sheets

LASER BEAM FREQUENCY DOUBLING SYSTEM

FIELD OF THE INVENTION

The invention relates to a system for doubling the frequency of a laser beam in an improved manner, and to a harmonic separation device for use in such a system. More specifically, the invention relates to a device for splitting into separate monochromatic beams a composite laser beam that contains at least one second order harmonic of the fundamental wavelength, i.e. at least one of the 2nd, 4th, 6th, etc. harmonics.

BACKGROUND OF THE INVENTION

A typical Nd:YAG laser produces a beam with a wavelength of 1.064 microns. A second harmonic of this fundamental wavelength has a wavelength of 0.532 microns and a fourth harmonic has a wavelength of 0.266 microns in the ultraviolet region of the spectrum.

There is a commercial need to obtain laser outputs of relatively high power at these latter, shorter wavelengths, or even at still shorter wavelengths.

PRIOR ART

It is known to convert a portion of a laser beam at a fundamental wavelength (which for convenience will be referred to in this specification as $2\lambda$) to a coincident beam at the second harmonic wavelength $\lambda$ by means of a crystal through which the fundamental beam is passed, but it then becomes necessary to process this combined beam by separating the second harmonic component $\lambda$ from the fundamental component $2\lambda$. After this has been done the separated beam containing substantially only the second harmonic component $\lambda$ can itself be treated to the same process in a further crystal whereby to generate a further second harmonic, $\lambda/2$, namely a fourth harmonic of the original fundamental, and so on.

Examples of YAG lasers operating in this manner are described in Lumonics pamphlets entitled "Hyperyag Series Lasers" published in 1991 and "Yagmaster Series III" published in 1992, the contents of which are incorporated herein by reference. In the system described in the first of these pamphlets the harmonic separator that is used is a prism, while in the system described in the second pamphlet the harmonic separator is a dichroic separator assembly.

As far as prism separators are concerned it has been found that with the materials available and especially at the shorter wavelengths, e.g. 0.266 microns, the beam power is limited by the need to prevent overheating from absorbed energy and consequent self-focusing which leads to high energy concentrations and damage to the prism. Similar problems have been encountered when using a dichroic reflective film as the harmonic separator.

SUMMARY OF THE INVENTION

The object of the present invention is to provide a system that can achieve second order harmonic separation from the fundamental wavelength component of a laser beam in a simple and inexpensive manner, while avoiding the foregoing problems, and especially a system that can operate at higher powers than has previously been possible without damage to the optical elements or coatings thereon.

To this end, the invention can employ a harmonic separator in the form of a binary level relief structure, e.g. a grating, either a transmissive or a reflective grating, that is formed with a binary level relief structure on at least one of its major surfaces. A "transmissive" grating is one that consists of a substrate that is not only transparent but also lacks any reflective coating, so that the laser beam enters the grating at one major surface of the substrate and exits the grating at its opposite major surface. The binary level relief structure can be located either at the entry surface or at the exit surface, or a pair of such structures can be used each located at a respective one of these surfaces.

A "reflective" grating consists of a substrate that includes a reflective coating on the surface with the relief structure. When this reflective coating is situated on the major surface opposite the entry surface, the substrate must be transparent. When both the relief structure and the reflective coating are located at the first major surface on which the beam is incident, the substrate is not restricted to transparent materials.

The number of times the beam traverses the relief structure consecutively has been designated t. For a transmissive grating $t=1$ and for a reflective grating $t=2$.

Another factor that has to be considered in calculating the performance of the grating is whether or not the beam traverses the substrate. This factor, which has been designated $\alpha$, is zero in the last mentioned case when the incident beam is immediately reflected and never enters the substrate. In all other cases the beam traverses the substrate either once, in the case of the three transmissive options, or twice, in the case of the two reflective options in which the reflective coating applied on the relief structure is located opposite the entry surface. Since for performance the important consideration is not how many times the beam traverses the substrate, but rather whether or not it traverses the substrate at all, it has been found convenient to define $\alpha$ as the number of times the beam traverses the substrate, but with a maximum value of 1.

The depth of the relief structure will be so chosen that the emerging beam (whether transmitted or reflected) will have had its phase shifted by $2\pi$ for the beam component $\lambda$ that is to be collected, while having been shifted in phase by only $\pi$ for the fundamental beam component $2\lambda$ that is to be dispersed and rejected. This requirement can also be expressed by stating that the difference between the two optical path lengths (an optical path length is the actual length of a beam path multiplied by the refractive index of the material in which such path exists) of the respective beam components, i.e. the rays passing through elevated portions of the relief structure compared with rays passing through unelevated portions of such structure, should be equal to $\lambda$, or at least substantially equal to $\lambda$. The further this difference deviates from equality with $\lambda$, the less effective the system becomes in separating the two components.

In one example of a system according to the invention there is employed a laser system having a composite beam comprising a fundamental wavelength $2\lambda$ and at least one second order harmonic $\lambda$. A harmonic separator for receiving this composite beam can comprise a transmissive grating in the form of a transparent substrate arranged to receive the beam in a direction normal to a major surface thereof (the entry surface), this surface being formed with a series of narrow parallel grooves of substantially rectangular cross-section, while the opposite major surface (the exit surface) is plane. The periodicity d of the grooves must be greater than 2λ, and each groove will have a width of ½d and a depth h in the direction of travel of the beam, the value of h being given by $$h \cdot t = \left| \frac{\lambda}{n_1 - n_0} \right| \quad (1)$$

where $n_0$ is the refractive index external of the grating, e.g. in air, $n_1$ is the refractive index of the substrate, and t is as defined above and in this case equals 1. Under these conditions λ is the wavelength component of the beam that will pass directly through the grating with substantially no change of direction, while wavelengths greater than λ will be diffracted away from the path of the beam.

If, instead of being located on the entry surface, the relief structure is situated on the exit surface, the same equation (1) applies, and t still equals 1.

In the case of a reflective grating, the relief structure and the reflective coating are located at the same surface and the depth h is given by $$h \cdot t = \frac{\lambda}{|\alpha n_1 - (1-\alpha)n_0|} \quad (2)$$

with $\alpha=1$ when the reflective coating is situated on the major substrate opposite to the entry surface and $\alpha=0$ when the reflective coating is on the entry surface.

The foregoing assumes that the incoming beam arrives in a direction normal to the grating structure. However, if it arrives at an angle $\theta_0$ relative to the normal to the major surface, the value for h is changed and must now satisfy a more general equation. As will be demonstrated below, in the case of a transmissive grating, equation (1) should be replaced by $$t \cdot |(b+e) \cdot n_1 - a\, n_0| = \lambda \quad (3)$$

In the case of a reflective grating, with the relief structure and reflective coating located at the same surface, equation (2) should be replaced by $$t \cdot |abn_1 - [ab(\sin\theta_0 \sin\theta_1) - (1-\alpha)a\cos^2\theta_0]n_0| = \lambda \quad (4)$$

where $$a = \frac{h}{\cos\theta_0}$$

$$b = \frac{h}{\cos\theta_1}$$

$$\theta_1 = \sin^{-1}\left[\frac{n_0}{n_1}\sin\theta_0\right]$$

$$e = c\sin\theta_1, \text{ and}$$

$$c^2 = a^2 + b^2 - 2ab\cos(\theta_0 - \theta_1)$$

As illustrated and more fully explained below, a more general form of relief structure can replace the parallel grooves with a series of separate elevated relief surfaces, the shape or shapes and spacings of which can be selected to determine the nature of the diffracted beam 2λ.

The relief structure, whether formed from a grooved grating or otherwise, can be considered as a plurality of cells that are substantially identical to each other, and each of which contains at least one elevated portion and at least one unelevated portion, e.g. a groove. The cells recur with a periodicity in at least one direction parallel to a major surface of the substrate, as will be more fully demonstrated below.

When it is desired to achieve virtually complete separation of λ from 2λ, the total elevated area of the relief structure in the general case just referred to, or the total area of the elevated portions between the grooves in the specific example given above, should be substantially equal to the total area of the lower (unelevated) surfaces of the structure. If these areas are not equal, the effect is to allow some of the fundamental 2λ beam component to remain combined with the λ beam component, a situation that may in some circumstance be desirable, e.g. in a multi-wavelength materials processing technique.

As a practical matter the value of λ will be limited to the range between 0.1 microns (ultraviolet) and 100 microns (infrared).

For specific wavelengths, the invention can consist of a grating per se.

For example, for use in an Nd:YAG laser, the invention provides a transmissive grating for use in air as a harmonic separator for separating a laser beam wavelength of approximately 1.064 microns from second order harmonics thereof, this grating comprising a substrate having a series of narrow grooves of substantially rectangular cross-section or another binary level relief structure formed in at least one of its major surface. When grooves are used, their periodicity will be greater than 1.064 microns and each groove will have a depth in microns of approximately 0.532 divided by $t(n_1-1)$, $n_1$ as before being the refractive index of the substrate, and t being the number of times the beam traverses the relief structure.

The invention also includes a reflective grating per se, the nature of such grating varying with the chosen option in relation to the location of the relief structure in relation to which major surface of the grating is designed to received the incident beam.

BRIEF DESCRIPTION OF THE DRAWINGS

FIGS. 7 and 8 respectively show still further alternatives to the basic construction, being respectively a transmissive and a reflective grating;

DETAILED DESCRIPTION OF THE PREFERRED EMBODIMENTS

Figures 1, 2:
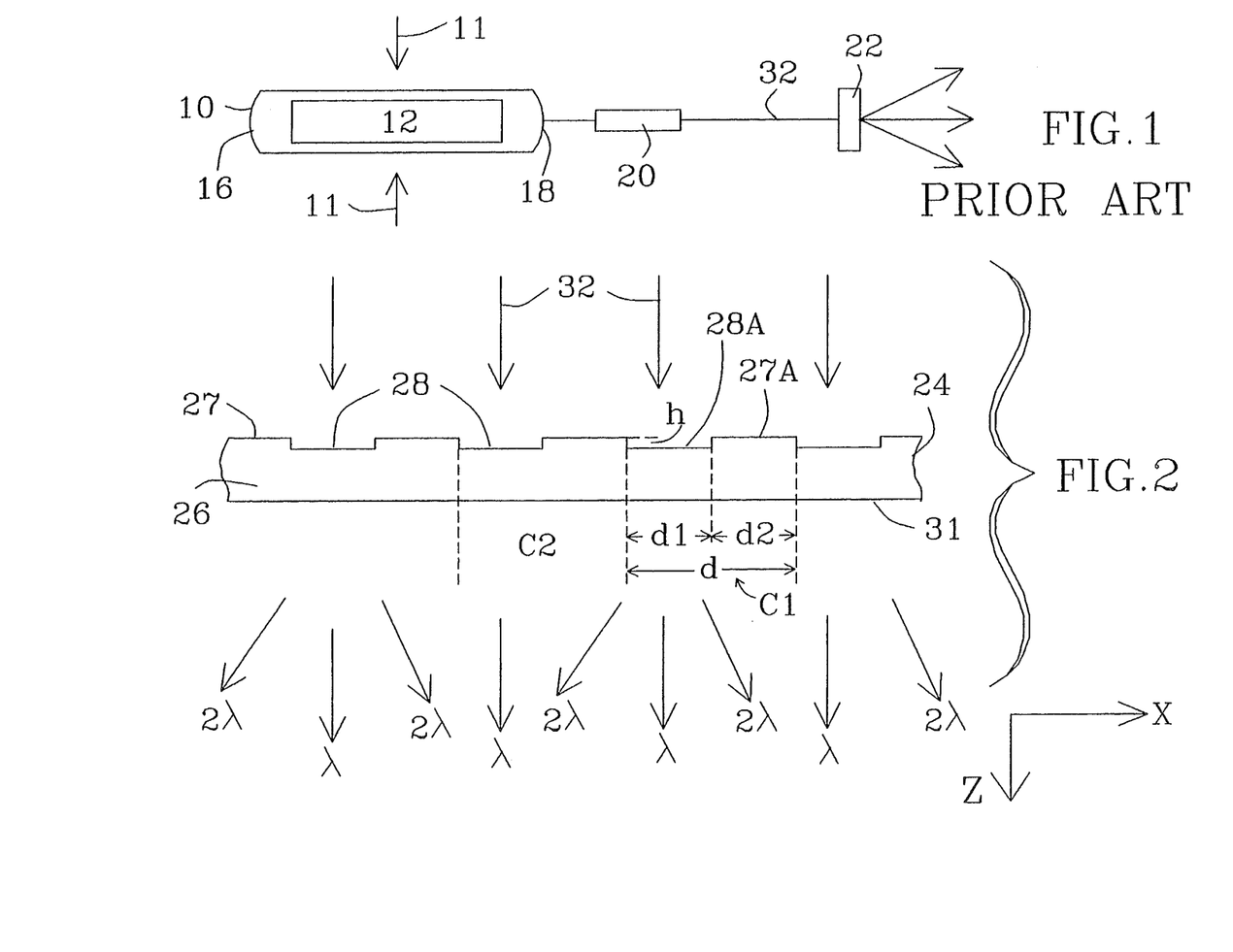
FIG. 1 shows diagrammatically a known manner in which a laser beam can have a second harmonic imposed on it and then separated from it.
FIG. 2 is an end view of a portion of a transmissive grating for use in a first embodiment of the invention.

FIG. 1 is a simplified diagram of a typical Nd:YAG laser 10 showing only the parts of present interest. The laser 10 which is externally pumped as indicated by the arrows 11 has a lasing cavity 12 including optics 16, 18. The output from the output mirror 18 passes through a harmonic generator 20 and then as a composite beam 32 to a harmonic separator 22. The various wavelength beams emerge from the separator 22 in divergent paths.

Figure 3:
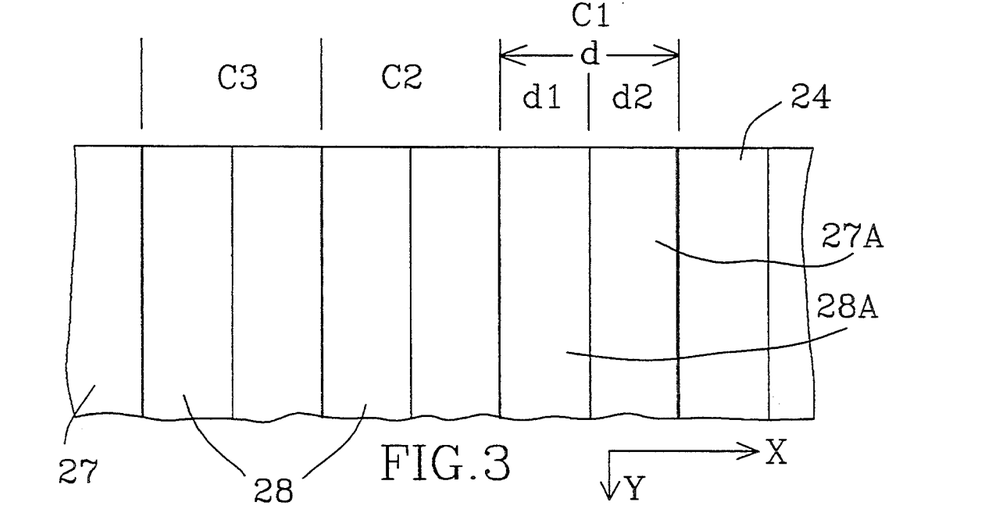
FIG. 3 is a partly cut-away plan view of FIG. 2.

In the present invention the separator 22 takes the form of a grating, one example of which is shown at 24 in FIGS. 2 and 3. These figures show a substrate 26 of any optical material transparent at the wavelengths involved, e.g. fused silica, in one major surface 27 of which there is etched a relief structure in the form of a series of parallel shallow rectangular grooves 28. The result is a typical elevated region 27A and a typical unelevated region 28A that together form a cell C1. The entire relief structure is thus made up of a series of identical cells C1, C2, C3 etc. that recur with a periodicity d in a direction X parallel to the major surface 27. In FIG. 2, each cell is assumed to extend for the full width of the surface 27 in the Y direction (FIG. 3).

Taking FIG. 2 as the primary transmissive example, each groove 28 has a depth h and a width d1, the spacing between the grooves being d2, and the periodicity d of the cells being d1 plus d2. The value for d will be chosen to be greater than, and usually many times greater than, the fundamental wavelength $2\lambda$, and the minimum values for d1 and d2 will both be greater than $\lambda$. For example, a typical value for d might be 8 to 10 microns for a value of $2\lambda$ of 1.064 microns. As explained in more detail below, it is not essential that d1 and d2 be equal to each other, although they have been so shown in FIG. 2.

As explained above, for a transmissive grating that is only traversed once by a perpendicularly incoming laser beam 32, i.e. when t=1, the value for h to achieve a $2\pi$ phase shift between the surfaces of the regions 27A and 28A is given by $$h = \left| \frac{\lambda}{n_1 - n_0} \right|$$

where $n_0$ is the refractive index external to the device, e.g. approximately 1 for air, and $n_1$ is the refractive index of the substrate, typically about 1.5 for fused silica.

Solving this equation with these values for the second harmonic wavelength of the Nd:YAG laser referred to above, i.e. 0.532 microns, gives a value for h of 1.064 microns. Under this condition, no diffraction occurs and the second harmonic component from the incoming composite beam 32 passes directly through, as shown at $\lambda$ in FIG. 2. However, for the fundamental wavelength component $2\lambda$ of the beam 32 the grating structure is now only half of its wavelength and thus causes only a $\pi$ phase shift, so that the structure adds destructively, causing the emerging light to be diffracted, as shown at $2\lambda$ in FIG. 2.

As explained above, while FIG. 2 shows the incoming light 32 entering the grating at its surface 27 and emerging from its opposite surface 31, this procedure can be reversed by inverting FIG. 2 so that the light enters at the surface 31 and exits at the surface 27 to achieve the same effect.

Figure 4:
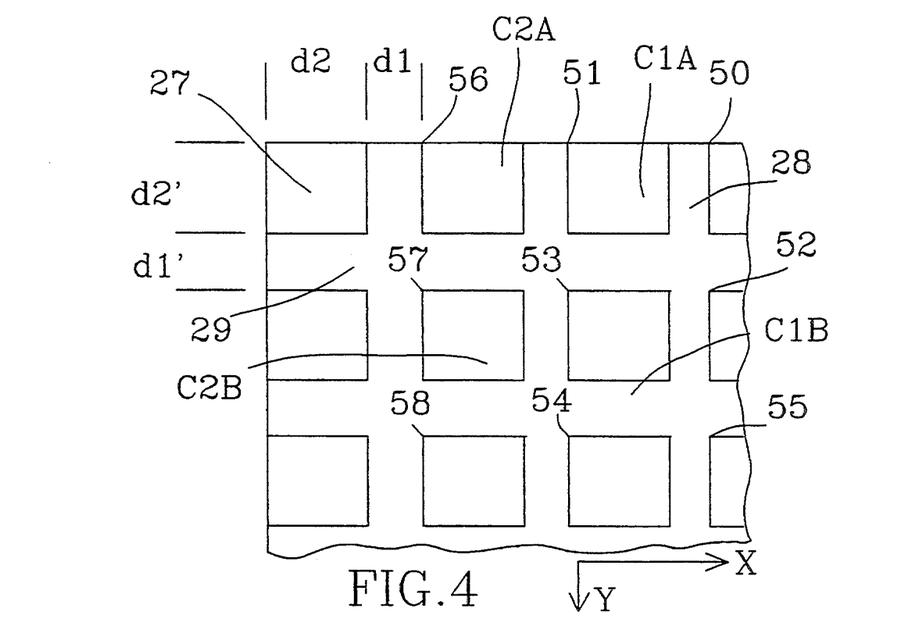
FIG. 4 is a modification of FIG. 3.

FIG. 4 shows an alternative in which additional similar grooves 29 extend transversely across the surface 27. In this case each cell recurs in both the X and Y directions, e.g. cell C1A defined within points 50, 51, 52 and 53; cell C1B within points 52, 53, 54 and 55; cell C2A within points 51, 53, 56 and 57; cell C2B within points 53, 54, 57 and 58; and so on. In this instance the periodicity of the cells is assumed to be approximately the same in both directions, although this is not a necessary requirement. On the assumption that it is desired to achieve full separation by having the total elevated area substantially equal to the total unelevated area, the value of d2 is here shown larger than d1, and that of d2' larger than d1'. Note that d2 need not necessarily equal d2', just as d1 need not equal d1'. The effect of this cell periodicity in the Y direction, as well as in the X direction, will be to cause the emerging $2\lambda$ components also to be diffracted in the Y direction.

Figure 5:
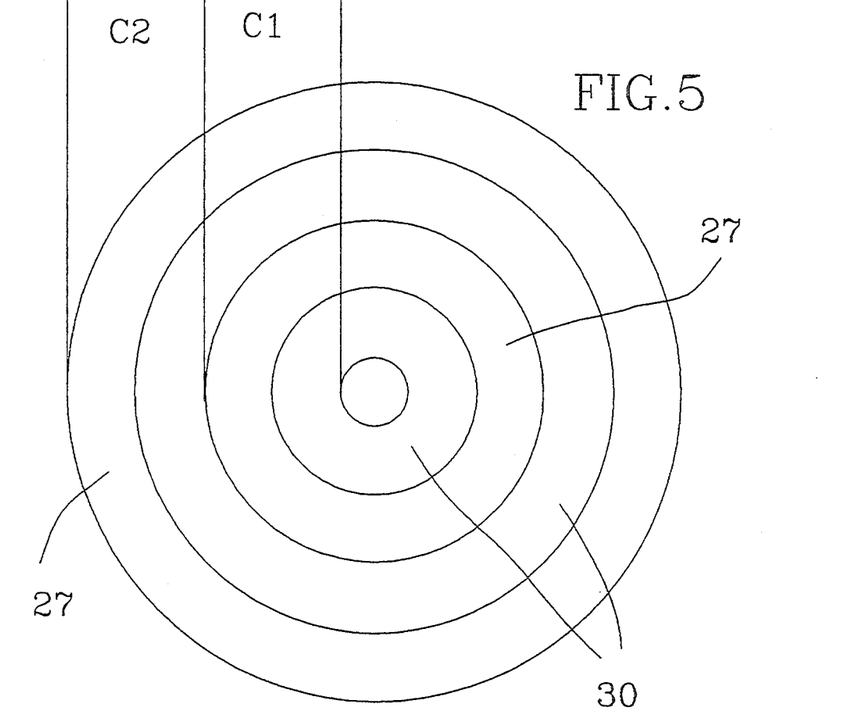
FIG. 5 is a plan view of an alternative embodiment.

A circular arrangement is shown in FIG. 5 in which there are concentric circular grooves 30 of similar depth h, the value of which will depend on whether the substrate is transmissive or reflective. These grooves are still of rectangular cross-section and are formed in the surface 27. In this case each cell C1, C2, etc. recurs radially.

Figure 6:
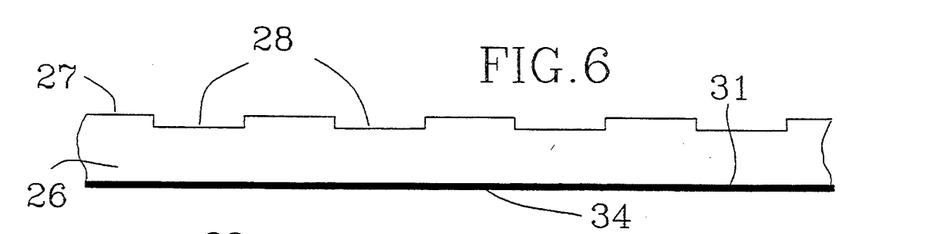
FIG. 6 illustrates an alternative to FIG. 2 in the form of a reflective grating.
Figure 8:
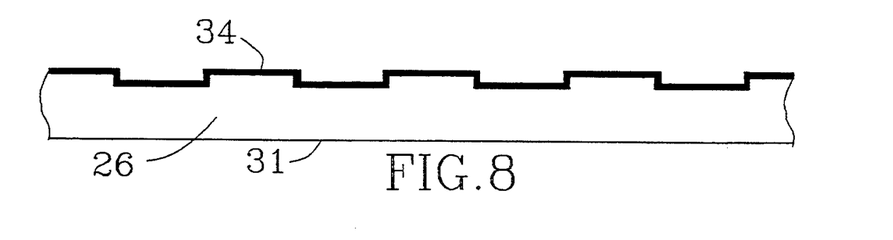

As shown in FIG. 6, by the addition of a reflective coating 34 on the undersurface 31 of the grating of FIG. 2, the same performance as two cascaded transmissive gratings can be obtained. In this case, equation 1 defines the value of h, with t=1, because the beam does not traverse the relief structure twice consecutively (it has to go through the substrate between the two crossings of the relief structure). While it is convenient to place the coating 34 on the undersurface of the substrate, the grating will function equally well if the coating 34 is on the upper surface, as shown in FIG. 8, assuming the beam is incident from above this construction, i.e. directly onto the coating 34. In this case, the value of t is equal to 2, because the beam traverses the binary level relief structure consecutively twice, and equation (2) determines the value of h, while $\alpha=0$. The structure of FIG. 8 can be used in an inverted orientation, with the beam entering and exiting the surface 31, in which case the value of h is still described by equation 2 and t still equals 2 but $\alpha=1$.

Figure 7:
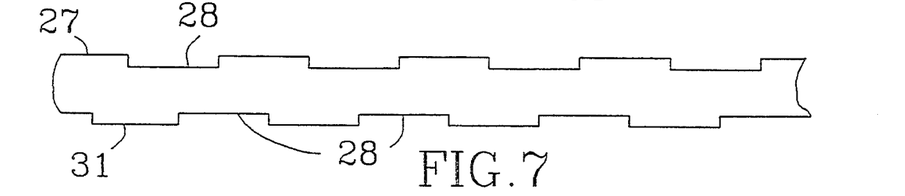

FIG. 7 shows how the grooves 28 can be formed in both the major surfaces of a transmissive grating. This feature of duplication of the relief structure also applies to any of the constructions of FIGS. 2 to 6. The groove depth will continue to have the value for h defined in equation (1). A construction involving duplication of the relief structure will have the advantage of a somewhat improved efficiency in terms of the ratio between the power passed through and that dissipated. In FIG. 7 the grooves 28 on the lower surface 31 have been shown misaligned with those on the upper surface 27 to avoid diffracted components $2\lambda$ from the upper (entry) surface recombining at the lower (exit) surface and again being diffracted to propagate together along the Z axis. To obtain this misalignment shown in FIG. 7, the relief structure of the lower surface is rotated about the Z axis with respect to the upper surface.

Figure 9A:
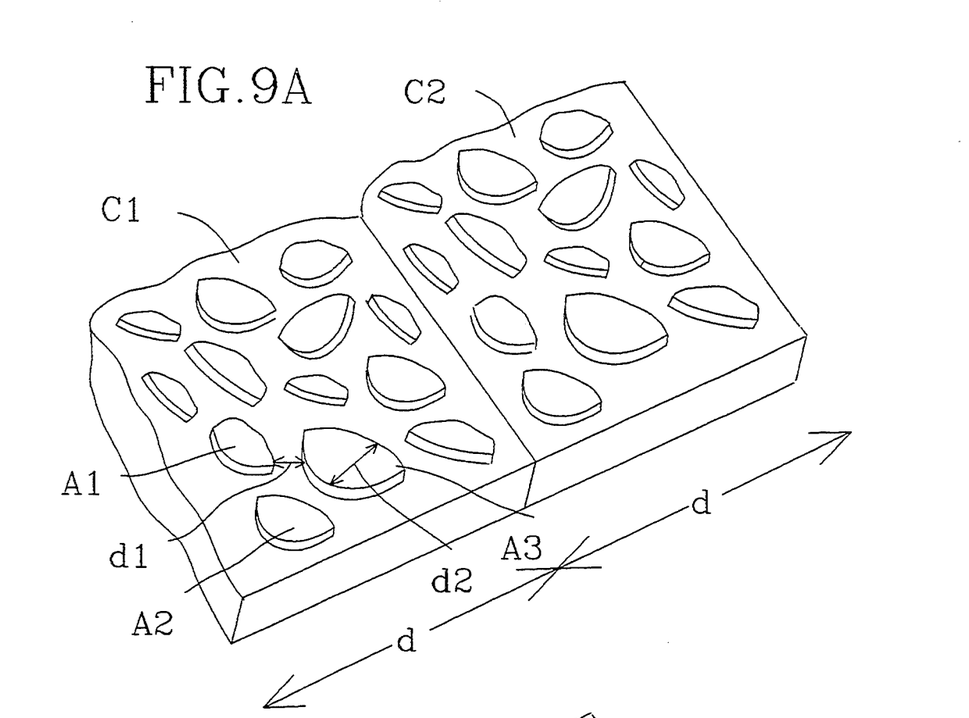
FIGS. 9A and 9B are perspective views of generalized forms of a binary level relief structure according to other embodiments of the invention.

FIG. 9A shows how elevated portions A1, A2, A3, etc. of a binary level relief structure according to a further embodiment of the invention can take different and more random shapes. These portions can be the same or different from each other in both shape and/or size, FIG. 9A showing a wide variety in this respect. Each such group of elevated portions and the unelevated portions between them will constitute a cell C1, C2 etc., the cells being essentially similar to each other and having a width defining the periodicity d. In FIG. 2 the equality of d1 and d2 meant that the total area of the elevated portions was equal to the total area of the unelevated portions, i.e. the grooves 28. If the same result is desired with the FIG. 9A construction, the total area of the elevated portions A1, A2, A3, etc. will be made equal to the total area of the unelevated portions between such elevated portions. In other words the total area of portions A1, A2, A3, etc. will be half the total area of the major surface of the substrate.

There will be a minimum value for the various spacings d1 between each pair of adjacent elevated portions A1 etc. and a minimum value for the various widths d2 of each elevated portion.

Figure 9B:
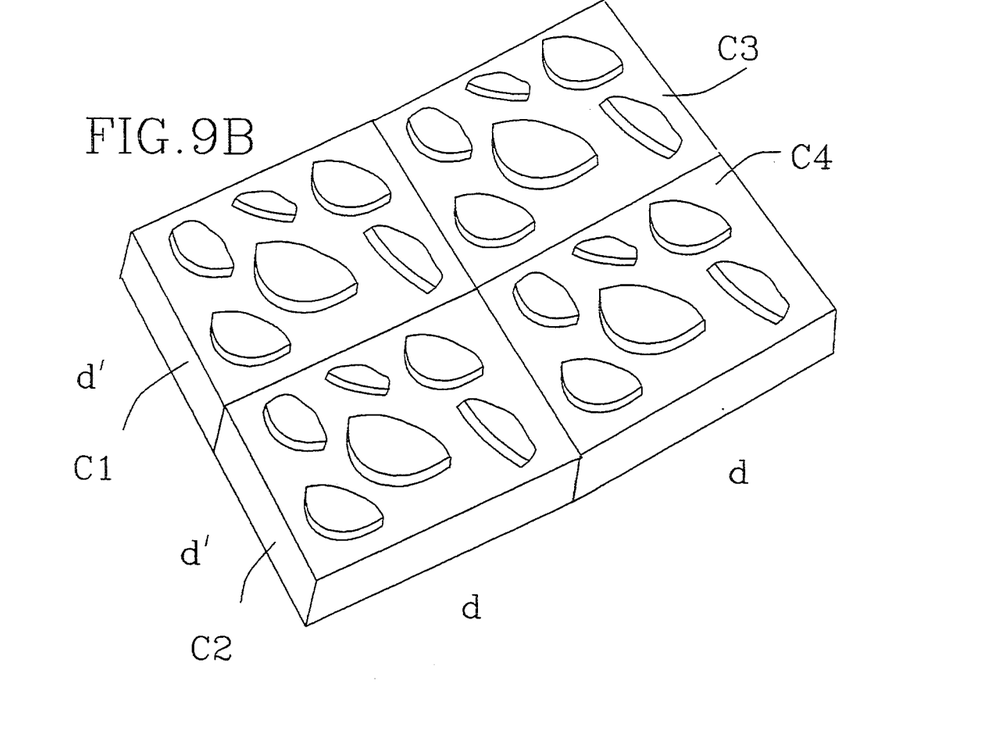

FIG. 9B shows a modification of the construction of FIG. 9A wherein the cells also recur with a periodicity d' in the second direction parallel to the substrate major surface, i.e. to form cells C1, C2, C3, C4 etc. The value of d', like d, must be greater than 2λ.

To summarize, the values of d1, d1', d2, d2', d and d' must be chosen in all cases, i.e. not only in the regular arrangements of FIGS. 2 to 8, but also in the fully generalized arrangements of FIGS. 9A and 9B, to comply with the requirements that the minimum values of the widths d1 (or d1') and d2 (or d2') must both be greater than λ, while the periodicity d (or d') must be greater than 2λ. Also, as a practical matter, the periodicity d (or d') must be such as to provide adequate beam separation between the separated λ and 2λ components at a reasonable distance, e.g. an angle between such separated beam components of about 3° or more.

It has been assumed throughout that the width of the incoming beam 32, or its shortest dimension in any direction transverse to its direction of travel if its cross-section is not circular or square, is also several times greater than d.

As mentioned above, the total areas of the two respective levels of the relief structure will normally be chosen to be equal to each other, because this equality provides virtually perfect separation of the λ and 2λ beams. However, there may be situations when it is desirable to obtain only partial separation, and this result can be achieved by adopting some deliberate inequality between these two total areas. In this case, the output beam λ will contain a percentage of energy at the 2λ wavelength, the amount of this percentage being dependent on the degree of such inequality.

Figure 10:
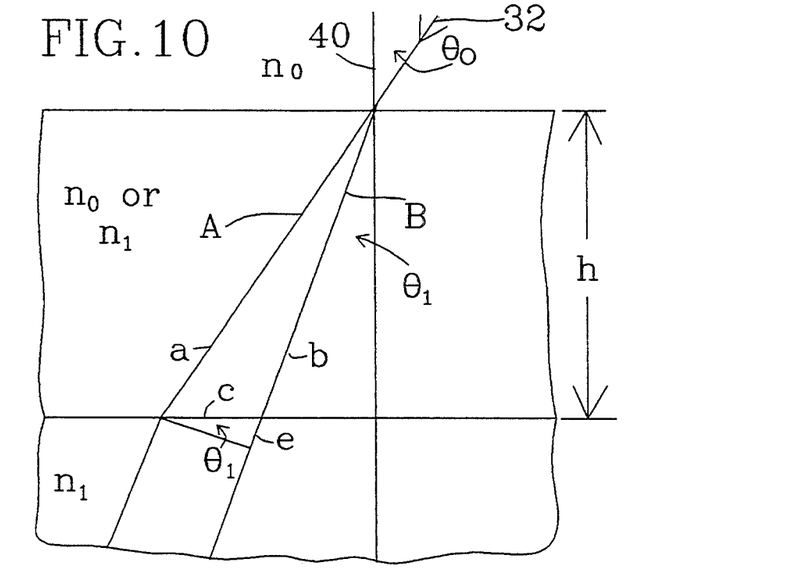
FIG. 10 is a diagram illustrating the effect on an incident beam arriving at an inclined angle to the structure of a transmissive grating.

FIG. 10 illustrates diagrammatically (with two different situations, i.e. the presence and absence of a groove, superimposed on each other to facilitate an understanding of the geometry) the effect of the incoming beam 32 arriving at the binary level relief structure at an angle $\theta_0$ to the normal 40 to the entry surface, when the grating is used in the transmissive mode. Line A shows the beam travel in refractive index $n_0$, e.g. in a groove, while line B shows the beam travel in refractive index $n_1$, e.g. through an elevated portion between grooves. The general formula for determining the value of h in these circumstances has been given above in equation (3). The dimensions a, b, c and e shown in FIG. 10 are defined above in connection with equations (3) and (4).

When this oblique incidence of the incoming beam is considered, it is desirable to avoid any "shadow" being cast by the elevated portions on the unelevated portions. This means that strip shaped cells should preferably be used, e.g. with a periodicity along only a single direction, with the incidence plane of the incoming beam containing the strips or straight grooves that form the relief structure. If shadows were cast, there would be part of the incoming component λ that would be removed from the incident direction, which is not generally desired for a harmonic separator.

Figure 11A:
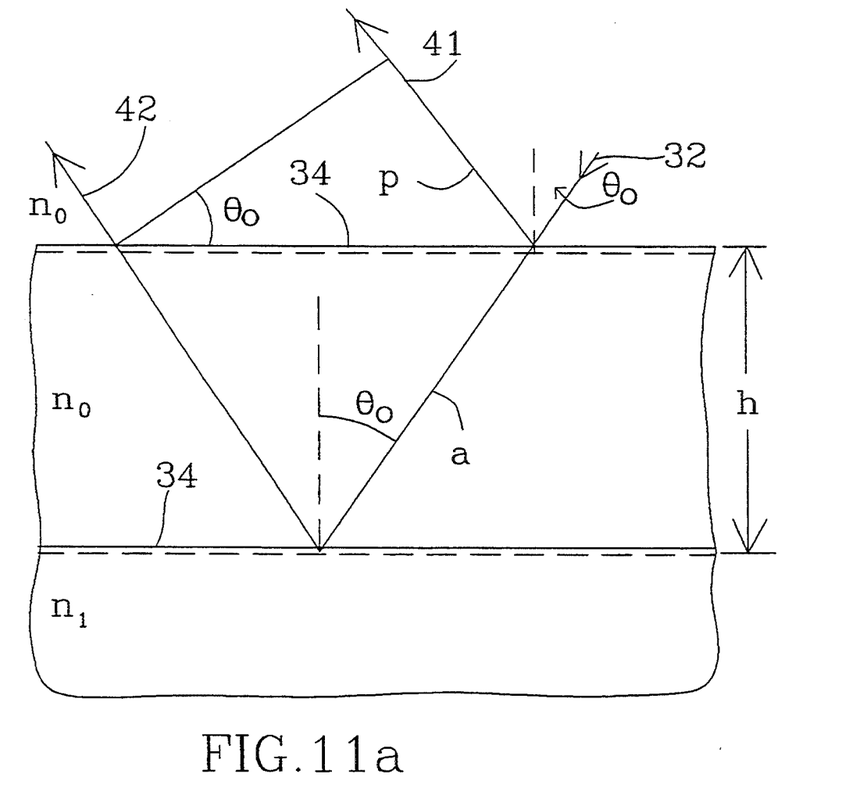
FIGS. 11a and 11b are respectively similar diagrams illustrating the effect on an incident beam in the two reflective grating options.
Figure 11B:
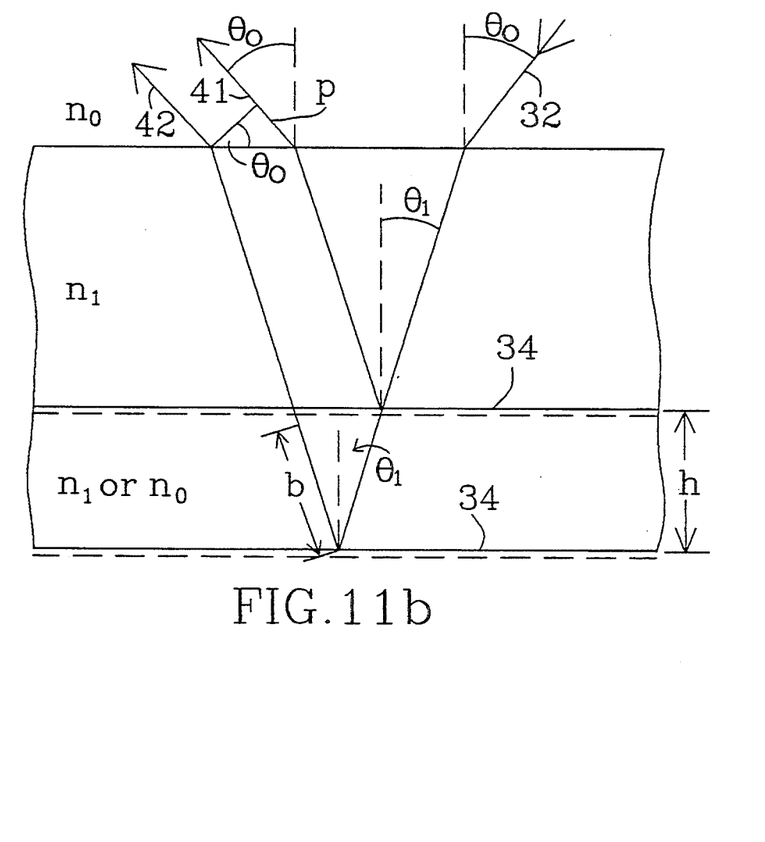

FIGS. 11a and 11b illustrate in a manner similar to FIG. 10 the effect of the incoming beam 32 arriving at the harmonic separator at an angle $\theta_0$ to the normal when the grating is reflective. FIG. 11a shows the geometry of the rays when the reflective relief structure is facing the incident light beam as shown in FIG. 8 (upright), while FIG. 11b illustrates the ray tracing when the reflective relief structure is opposite to the incoming beam, i.e. FIG. 8 inverted with the beam entering at the surface 31.

As mentioned above, the condition to be satisfied for an ideal separation of the fundamental wavelength 2λ from the first harmonic λ is for the optical path length difference between the two emerging beams 41 and 42 to be equal to λ.

From FIG. 11a it can be shown that this requirement can be written $$(2a-p)n_0=\lambda$$

or $$2an_0\cos^2\theta_0=\lambda \qquad (5)$$

where $$a=h/\cos\theta_0$$

h still representing the depth of the grooves. For the case where the reflective coating and the relief structure are opposite to the incoming beam (FIG. 11b) the requirement for harmonic separation becomes $$2n_1b-n_0p=\lambda$$

or $$2[bn_1-b(\sin\theta_0\sin\theta_1)n_0]=\lambda \qquad (6)$$

where $$b=h/\cos\theta_1$$

and according to Snell law of refraction $$\theta_1 = \sin^{-1}\left[\frac{n_0}{n_1}\sin\theta_0\right]$$

To combine equations (5) and (6) the parameter $\alpha$ can be used. $\alpha=1$ when the reflective relief surface is on the remote major surface of the substrate and $\alpha=0$ when the reflective surface is on the major surface that receives the incoming beam. The combination of equations (5) and (6) corresponds to equation (4) which was presented above without demonstration.

Figure 12:
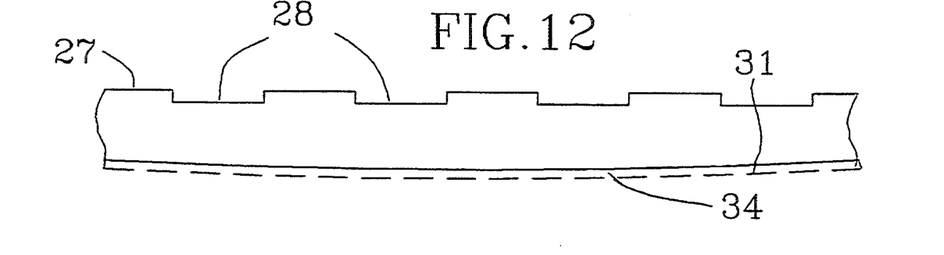
FIG. 12 shows an alternative to the construction of FIG. 6.

FIG. 12 shows a variant of the FIG. 6 construction wherein the reflective coating 34 is curved to achieve a focusing effect on the emerging beam. Such curvature, which may be in either the X direction or the Y direction or both, can also be applied to the major surface of the grating at which the relief structure is located.

The invention is also applicable for use with CO2 lasers operating with a wavelength in the range of 9 to 11 microns, and to diode lasers operating with a wavelength in the range of 0.6 to 1.5 microns.

Merits of the system are that the performance of the binary level relief structure is relatively insensitive to
(a) the beam line width (tolerating up to 50 nm);
(b) tilting of the structure, should the incoming beam 32 not arrive normal to the surface 27 (or 31) as shown in FIGS. 10, 11a and 11b;
(c) polarization of the beam; or
(d) the alignment of the beam centrally of the relief structure.

In addition, the short optical path lengths tend to minimise any self focusing effects, and the structures have high damage thresholds and can thus transmit higher powered beams than has been practicable in the past.

A broad range of optical materials, not only fused silica, can be etched with modern etching techniques to form the relief structures with high precision.

We claim:

1. In a laser system having a composite beam comprising a first component of a fundamental wavelength $2\lambda$ and a second component of at least one second order harmonic $\lambda$, the value of $\lambda$ being within the range of 0.1 microns and 100 microns; a harmonic separator for receiving said composite beam at an angle $\theta_0$ to a normal to a major surface thereof, and for effecting separation between the $\lambda$ and $2\lambda$ components thereof, said harmonic separator comprising a substrate and a binary level relief structure at at least one major surface of said substrate, said relief structure having elevated and unelevated portions at its two respective levels with the spacing between said levels being h, said relief structure being formed of a repeating series of cells that are substantially identical to each other, and each of which cells contains at least one said elevated portion and at least one said unelevated portion, said cells recurring with a periodicity d greater than $2\lambda$ in at least one direction parallel to said major surface, the minimum width of the unelevated portion between each adjacent pair of elevated portions being greater than $\lambda$, the minimum width of each elevated portion being greater than $\lambda$, the smallest dimension of the beam transverse to its direction of travel being greater than the periodicity d, and the values of h and $\theta_0$ being such that the difference between the optical path length for rays passing through elevated portions and the optical path length for rays passing through unelevated portions is substantially equal to $\lambda$, whereby components of wavelength greater than $\lambda$ are diffracted away from the path of the beam component of wavelength $\lambda$ to effect said separation thereof.

2. A system according to claim 1, wherein the total surface area of the elevated portions is substantially equal to the total surface area of the unelevated portions whereby to achieve substantially complete separation of the $\lambda$ and $2\lambda$ beam components.

3. A system according to claim 1, wherein the total surface area of the elevated portions is unequal to the total surface area of the unelevated portions whereby to achieve only partial separation of the $\lambda$ and $2\lambda$ beam components.

4. A system according to claim 1, wherein the separator is transmissive, said relief structure is provided at only one said major surface, and the value of h is determined by $$|(b+e)\cdot n_1 - a\, n_0| = \lambda$$

where $$a = \frac{h}{\cos\theta_0}$$

$$b = \frac{h}{\cos\theta_1}$$

$$\theta_1 = \sin^{-1}\left[\frac{n_0}{n_1}\sin\theta_0\right]$$

$$e = c\sin\theta_1,$$

$$c^2 = a^2 + b^2 - 2ab\cos(\theta_0 - \theta_1),$$

$n_0$ is the refractive index external of the separator, and $n_1$ is the refractive index of the substrate.

5. A system according to claim 4, wherein $\theta_0$ is substantially equal to zero and the value of h is given by $$h = \frac{\lambda}{|n_1 - n_0|}.$$

6. A system according to claim 1, including a reflective coating on said major surface at which the relief structure is located, a second major surface opposite the surface with the reflective coating being oriented to receive said composite beam, and the value of h is determined by $$2\cdot|bn_1 - b(\sin\theta_0\sin\theta_1)\cdot n_0| = \lambda$$

where $$a = \frac{h}{\cos\theta_0}$$

$$b = \frac{h}{\cos\theta_1}$$

$$\theta_1 = \sin^{-1}\left[\frac{n_0}{n_1}\sin\theta_0\right]$$

$n_0$ is the refractive index external of the separator, and $n_1$ is the refractive index of the substrate.

7. A system according to claim 6, wherein $\theta_0$ is substantially equal to zero and the value of h is given by $$2h = \frac{\lambda}{n_1}.$$

8. A system according to claim 1, including a reflective coating on said major surface at which the relief structure is located, said surface being oriented to receive said composite beam directly without the beam passing through the substrate, and the value of h is determined by $$2\cdot|a\cos^2\theta_0\cdot n_0| = \lambda$$

where $$a = \frac{h}{\cos\theta_0}$$

and $n_0$ is the refractive index external of the separator.

9. A system according to claim 8, wherein $\theta_0$ is substantially equal to zero and the value of h is given by $$2h = \frac{\lambda}{n_0}.$$

10. A system according to claim 1, wherein said unelevated portions of the relief structure comprise a uniform series of narrow grooves of substantially rectangular cross-section, the width of each groove being substantially equal to the width of each elevated portion between said grooves.

11. A system according to claim 10, wherein said grooves are parallel to each other.

12. A system according to claim 10, wherein said grooves are concentric with each other.

13. A system according to claim 10, including a second series of said grooves intersecting the first said series.

14. A system according to claim 1, wherein a major surface of the grating at which there is located at least one of a said relief structure and a reflective coating is curved whereby to provide a focusing effect on a separated beam component.

15. A grating for use in air as a harmonic separator for separating a laser beam wavelength of approximately 1.064 microns from second order harmonics thereof, said grating comprising a transmissive substrate having on a major surface thereof a binary level relief structure in the form of a series of narrow grooves of substantially rectangular cross-section, the grooves having a periodicity greater than 1.064 microns, the width of each groove being greater than 0.532 microns, the width of elevated portions of the structure formed between the grooves being greater than 0.532 microns, and each groove having a depth h in microns of approximately 0.532 divided by $(n_1-1)$, where $n_1$ is the refractive index of the substrate.

16. A grating according to claim 15, wherein the grating has a second similar relief structure on a second major surface thereof, the depth of each grooves of each relief structure being h.

17. A grating for use in air as a harmonic separator for separating a laser beam wavelength of approximately 1.064 microns from second order harmonics thereof, said grating comprising a transparent substrate having on an entry major surface thereof a binary level relief structure in the form of a series of narrow grooves of substantially rectangular cross-section, and a reflective coating on a major surface remote from said entry surface, the grooves having a periodicity greater than 1.064 microns, the width of each groove being greater than 0.532 microns, the width of elevated portions of the structure formed between the grooves being greater than 0.532 microns, and each groove having a depth in microns of approximately 0.532 divided by $(n_1-1)$, where $n_1$ is the refractive index of the substrate.

18. A grating for use in air as a harmonic separator for separating a laser beam wavelength of approximately 1.064 microns from second order harmonics thereof, said grating comprising a transparent substrate having on one major surface thereof a reflective coating and a binary level relief structure in the form of a series of narrow grooves of substantially rectangular cross-section, the substrate having a major surface opposite the surface bearing the relief structure for entry and exit of the beam, the grooves having a periodicity greater than 1.064 microns, the width of each groove being greater than 0.532 microns, the width of elevated portions of the structure formed between the grooves being greater than 0.532 microns, and each groove having a depth in microns of approximately 0.532 divided by $2n_1$, where $n_1$ is the refractive index of the substrate.

19. A grating for use in air as a harmonic separator for separating a laser beam wavelength of approximately 1.064 microns from second order harmonics thereof, said grating comprising a substrate having on one major surface thereof a reflective coating and a binary level relief structure in the form of a series of narrow grooves of substantially rectangular cross-section, said surface bearing the relief structure serving to receive and reflect an incident beam, the grooves having a periodicity greater than 1.064 microns, the width of each groove being greater than 0.532 microns, the width of elevated portions of the structure formed between the grooves being greater than 0.532 microns, and each groove having a depth in microns of approximately 0.266.

* * * * *